US012786075B2

(12) United States Patent
Gu

(10) Patent No.: US 12,786,075 B2
(45) Date of Patent: Nov. 3, 2026

(54) WIRELESS COMMUNICATION METHOD AND WIRELESS COMMUNICATION DEVICE

(71) Applicant: SHENZHEN TCL NEW TECHNOLOGY CO., LTD., Guangdong (CN)

(72) Inventor: Junrong Gu, Shenzhen (CN)

(73) Assignee: SHENZHEN TCL NEW TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 19/122,693

(22) PCT Filed: Nov. 7, 2022

(86) PCT No.: PCT/CN2022/130198
§ 371 (c)(1),
(2) Date: Apr. 18, 2025

(87) PCT Pub. No.: WO2024/098170
PCT Pub. Date: May 16, 2024

(65) Prior Publication Data
US 2026/0156044 A1 Jun. 4, 2026

(51) Int. Cl.
*G06F 15/173* (2006.01)
*H04B 7/06* (2006.01)
(Continued)

(52) U.S. Cl.
CPC ........... *H04L 41/16* (2013.01); *H04B 7/0626* (2013.01); *H04W 72/23* (2023.01)

(58) Field of Classification Search
CPC ....... H04L 41/16; H04W 72/23; H04B 7/0626
(Continued)

(56) References Cited

U.S. PATENT DOCUMENTS 12,399,750 B2 * 8/2025 Kou .......................... G06N 3/08
12,591,813 B1 * 3/2026 Mahale .................. G06N 20/00
(Continued)

FOREIGN PATENT DOCUMENTS

CN 112703485 A 4/2021
CN 114614962 A 6/2022

OTHER PUBLICATIONS

International Search Report and Written Opinion of the International Search Authority in International application No. PCT/CN2022/130198, mailed on Jun. 21, 2023.
(Continued)

*Primary Examiner* — Alan S Chou
(74) *Attorney, Agent, or Firm* — PV IP PC; Wei Te Chung

(57) ABSTRACT

The disclosure provides a wireless communication method and a wireless communication device. The device receives an indication that triggers a model operation associated with a specific ML model, wherein the specific ML model supports a device operation, wherein the wireless communication device requires a processing time to complete the model operation and a predefined time to complete the device operation. The predefined time is referred to as a time threshold. The device uses specific ML model, an original ML model, or a non-artificial intelligence (non-AI) method to perform the device operation within the preset period based a relation between the processing time and the time threshold.

20 Claims, 8 Drawing Sheets

(51) Int. Cl.
*H04L 41/16* (2022.01)
*H04W 72/23* (2023.01)

(58) Field of Classification Search
USPC .......................................................... 709/224
See application file for complete search history.

(56) References Cited

U.S. PATENT DOCUMENTS

| | | | | |
|---|---|---|---|---|
| 12,651,197 | B2 * | 6/2026 | Cmielowski | G06N 20/00 |
| 2019/0303197 | A1 | 10/2019 | Li et al. | |
| 2019/0325354 | A1 | 10/2019 | Rajnayak et al. | |
| 2019/0356516 | A1 | 11/2019 | Cao et al. | |
| 2021/0158151 | A1 | 5/2021 | Wang | |
| 2022/0338189 | A1 | 10/2022 | Madadi et al. | |
| 2023/0155702 | A1 * | 5/2023 | Wang | H04B 17/391 370/252 |
| 2024/0129759 | A1 * | 4/2024 | Ren | G06F 11/0778 |
| 2024/0256970 | A1 * | 8/2024 | Pantelidou | H04W 24/02 |
| 2025/0038816 | A1 * | 1/2025 | Beluri | H03M 7/70 |
| 2025/0053872 | A1 * | 2/2025 | Fevold | G06N 3/045 |

OTHER PUBLICATIONS

European Office Action issued in corresponding European Patent Application No. 22964649.2 dated Jul. 28, 2026, pp. 1-9.

* cited by examiner (a)

(b)

WIRELESS COMMUNICATION METHOD AND WIRELESS COMMUNICATION DEVICE

CROSS REFERENCE TO RELATED APPLICATIONS

The disclosure is a US national phase application based upon an International Application No. PCT/CN2022/130198, filed on Nov. 7, 2022, titled "WIRELESS COMMUNICATION METHOD AND WIRELESS COMMUNICATION DEVICE" which is incorporated by reference in the present application in its entirety.

TECHNICAL FIELD

The present disclosure relates to the field of communication systems, and more particularly, to a wireless communication method and a wireless communication device.

BACKGROUND ART

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Technical Problem

In 3GPP Rel-18, a study item (SI) "Artificial Intelligence (AI)/Machine Learning (ML) for NR Air Interface" will start to develop. The AI/ML is applied to the 3GPP telecommunication system, and several use cases are investigated and studied, including enhanced channel state information (CSI) feedback, the beam management and the positioning.

Typically, the beam selection is based on the measurement of channel state information (CSI)-reference signal (CSI-RS)/synchronization signal block (SSB). This process costs a large amount of reference signals and delay. Thus, predictive beam switching is proposed to reduce the delay. Applying ML to beam management is to be studied.

Another use case is the positioning. The AI/ML is applied to assist the conventional reference signal (RS) based positioning method. Or the AI/ML is used to output the UE positioning information directly.

There are many operations/actions for an ML model to work, such as model activation, model deactivation, model training, inference, model monitoring, model deployment, and fine-tuning Conflicts may occur between some of these operations. For example, AI/ML model inference may be interrupted by model updates. Model updates can involve all the ML models, parts of the ML models, or a backbone of ML models. If an ML model is undergoing updating, the model cannot perform inference at the same time. In addition to interruption to inference caused by model update, other kinds of conflicts, such as interruption to CSI reporting by model selection, switching, or fallback, between operations may happen in a UE.

One operation usually has a default processing time. The processing time depends on the UE capacity, network (gNB) configuration, and/or model complexity. Some operations, such as CSI reporting, beam selection, and the similar, between a UE and the network have a time requirement (or latency requirement). One operation can be blocked by the other and cannot meet the time requirement. For example, the device operation/action, such as CSI report, using an ML model under model-tuning should wait until the model-tuning is done. Alternatively, during a device operation, such as CSI reporting, using a legacy ML model, a model update operation should wait until the device operation served by the legacy ML model completes. These two examples of time dependency between operations show that ML applications in telecommunication need further study and enhancement.

Hence, a wireless communication method to address the conflicts and time dependency between operations (e.g., ML operations and/or device operations) is desirable.

Technical Solution

An object of the present disclosure is to propose a wireless communication device, such as a user equipment (UE) or a base station, and a wireless communication method based on machine learning.

In a first aspect, an embodiment of the invention provides wireless communication method for machine learning (ML), executable in a wireless communication device, comprising, receiving an indication that triggers a model operation associated with a specific ML model, wherein the specific ML model provides a service to support a device operation, wherein the wireless communication device requires a processing time to complete the model operation and a predefined time to complete the device operation, the predefined time is referred to as a time threshold;

determining a preset period that is limited by a length of the time threshold and starts from reception of the indication, and determining a processing period that is limited by a length of the processing time and starts from reception of the indication;

using an original ML model or a non-artificial intelligence (non-AI) method to perform the device operation within the preset period when the processing time is greater than the time threshold; and using the original ML model, the non-AI method, or the specific ML model to perform the device operation within the preset period when the processing time is not greater than the time threshold, wherein the original ML model or the non-AI method is used to perform the device operation within the processing period, and the specific ML model is used to perform the device operation upon the end of the processing period before an end of the preset period.

In a second aspect, an embodiment of the invention provides a wireless communication device comprising a processor configured to call and run a computer program stored in a memory, to cause a device in which the processor is installed to execute the disclosed method.

The disclosed method may be implemented in a chip. The chip may include a processor, configured to call and run a computer program stored in a memory, to cause a device in which the chip is installed to execute the disclosed method.

The disclosed method may be programmed as computer-executable instructions stored in non-transitory computer-readable medium. The non-transitory computer-readable medium, when loaded to a computer, directs a processor of the computer to execute the disclosed method.

The non-transitory computer-readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, which causes a computer to execute the disclosed method.

The disclosed method may be programmed as a computer program, which causes a computer to execute the disclosed method.

Advantageous Effects

Some embodiments of the disclosure provide a wireless communication method to address the conflicts between operations. Some embodiments of the disclosure provide rules for selecting a service from a legacy ML model, a new ML model, or a non-AI module (e.g., a non-AI CSI processing module/unit/procedure/program, non-AI beam selection module/unit/procedure/program). An embodiment of the disclosed method provides model switching during a device operation. One or more time thresholds are used for the model switching (or initiating an operation/action).

Some embodiments of the disclosure provide a wireless communication method to address the time dependency between operations.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure. A person having ordinary skill in this field can obtain other figures according to these figures without paying the premise.

DETAILED DESCRIPTION OF EMBODIMENTS

Figure 1:
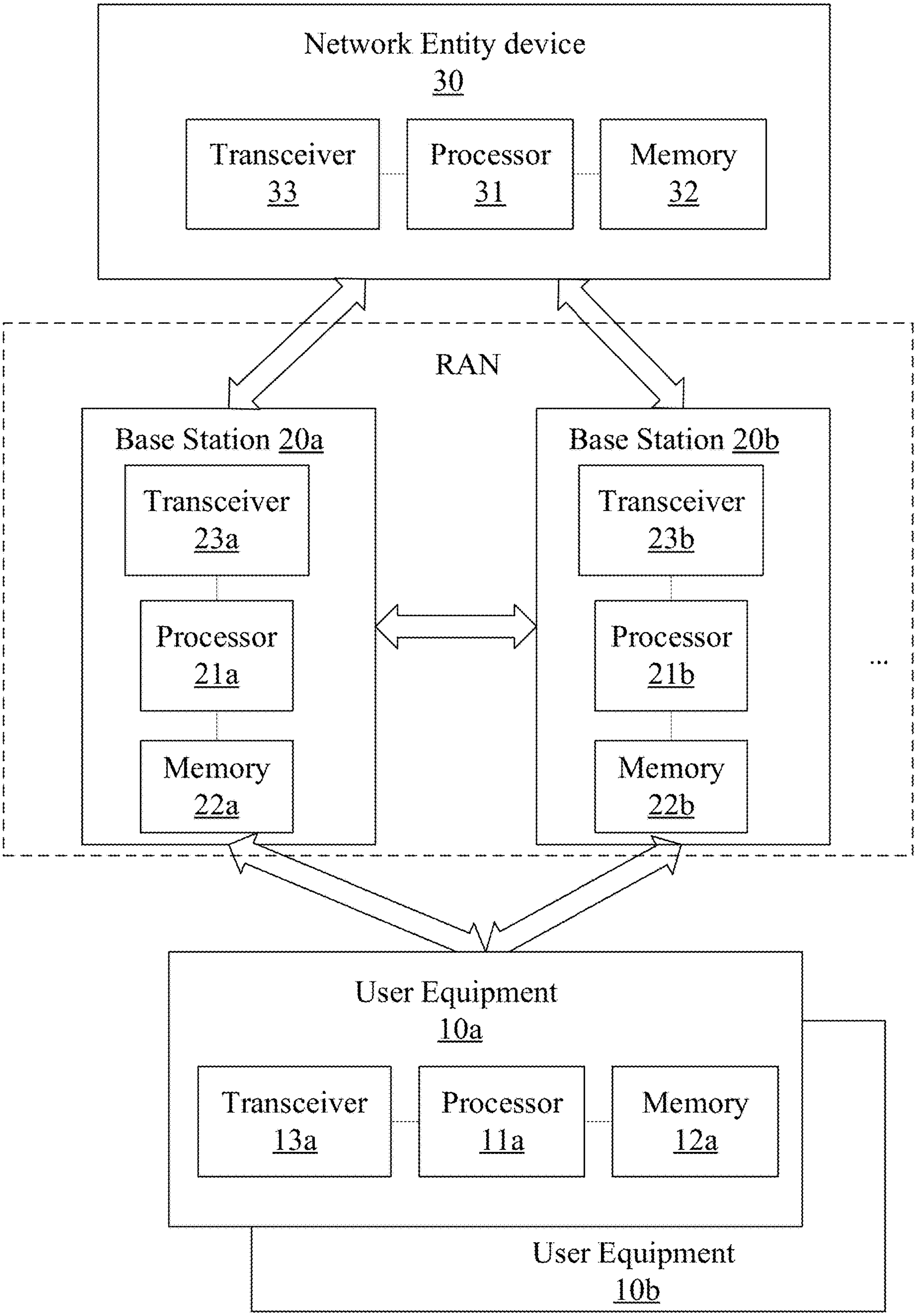
FIG. 1 illustrates a schematic view showing an example wireless communication system comprising a user equipment (UE), a base station, and a network entity.

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Embodiments of the disclosure are related to artificial intelligence (AI) and machine learning (ML) for new radio (NR) air interface and address problems of model switching.

In some embodiments of the disclosure, a method is provided to resolve the conflicts of different operations. The operations for an ML model can comprise activation, deactivation, model switching, fallback, training, data collection, and model monitoring. In some embodiments, a method is provided to decide a scheme for reporting or outputting from a UE according to a time threshold. For example, the reporting or outputting may comprise channel state information (CSI) reporting, beam prediction, positioning, and others.

A network (e.g., a gNB, RAN, CN, or a combination of RAN and CN) or a UE may decide to perform model operation(s)/action(s), such as one or more of model selection, activation, deactivation, switching, fallback, model training, model monitoring, and fine-tuning at least for one-sided models and two-sided models. The scheme of a network deciding to perform a model operation is referred to as decision by the network, and the scheme of a UE deciding to perform a model operation is referred to as decision by the UE.

Decision by the network:

- Network-initiated: A decision for performing a model operation may be initiated and made by the network.
- UE-initiated: A decision for performing a model operation may be initiated by the UE, and made by the network. The UE requests the network to perform the decision.

Decision by the UE:

- Event-triggered: A decision for performing a model operation may be event-triggered as configured by the network and made by a UE. The UE reports the decision to the network.
- UE-side-autonomous: A UE autonomously makes a decision for performing a model operation and reports the decision to the network.

UE-side-autonomous: A UE autonomously makes a decision for performing a model operation and does not report the decision to the network.

In some embodiments, a method is provided to address the time dependency, such as the time dependency between the model inference and model fine-tuning.

For simplicity, an AI/ML model, AI model, ML model, and model are interchangeably used in the description. In the description, device operations may comprise channel state information (CSI) reporting, beam prediction, positioning, and others. Model operations may comprise model selection, activation, deactivation, switching, fallback, model training, model monitoring, and/or fine-tuning at least for one-sided models and two-sided models.

In the description of embodiments of the disclosure, model switching comprises switching off or deactivating a model and switching on or activating another model. The model update may include updating model parameters, updating model structure, or updating the backbone of a model. An operation of model update enhances or updates a current ML model to an enhanced ML model. The current ML may be referred to as a legacy ML model. The legacy ML mode may be an ML model that has been deployed and/or installed in a wireless communication device. A third node may comprise an application server, a gNB, or a UE.

With reference to FIG. 1, a telecommunication system including a UB 10*a*, a base station 20*a*, a base station 20*b*, and a network entity device 30 executes the disclosed method according to an embodiment of the present disclosure. FIG. 1 is shown for illustrative, not limiting, and the system may comprise more UEs, BSs, and CN entities. Connections between devices and device components are shown as lines and arrows in the FIGS. The UE 10*a* may include a processor 11*a*, a memory 12*a*, and a transceiver 13*a*. The base station 20*a* may include a processor 21*a*, a memory 22*a*, and a transceiver 23*a*. The base station 20*b* may include a processor 21*b*, a memory 22*b*, and a transceiver 23*b*. The network entity device 30 may include a processor 31, a memory 32, and a transceiver 33. Each of the processors Ila, 21*a*, 21*b*, and 31 may be configured to implement the proposed functions, procedures, and/or methods described in this description. Layers of radio interface protocol may be implemented in the processors 11*a*, 21*a*, 21*b*, and 31. Each of the memory 12*a*, 22*a*, 22*b*, and 32 operatively stores a variety of programs and information to operate a connected processor. Each of the transceivers 13*a*, 23*a*, 23*b*, and 33 is operatively coupled with a connected processor, and transmits and/or receives a radio signal. Each of the base stations 20*a* and 20*b* may be an eNB, a gNB, or one of other radio nodes.

Each of the processors 11 *a*, 21 *a*, 21 *b*, and 31 may include a general-purpose central processing unit (CPU), application-specific integrated circuits (ASICs), other chipsets, logic circuits and/or data processing devices. Each of the memory 12*a*, 22*a*, 22*b*, and 32 may include read-only memory (ROM), a random-access memory (RAM), a flash memory, a memory card, a storage medium and/or other storage devices. Each of the transceivers 13*a*, 23*a*, 23*b*, and 33 may include baseband circuitry and radio frequency (RF) circuitry to process radio frequency signals. When the embodiments are implemented in software, the techniques described herein can be implemented with modules, procedures, functions, entities and so on, that perform the functions described herein. The modules can be stored in a memory and executed by the processors. The memory can be implemented within a processor or external to the processor, in which those can be communicatively coupled to the processor via various means are known in the art.

The network entity device 30 may be a node in a CN. CN may include LTE CN or 5GC which may include user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

Figure 2:
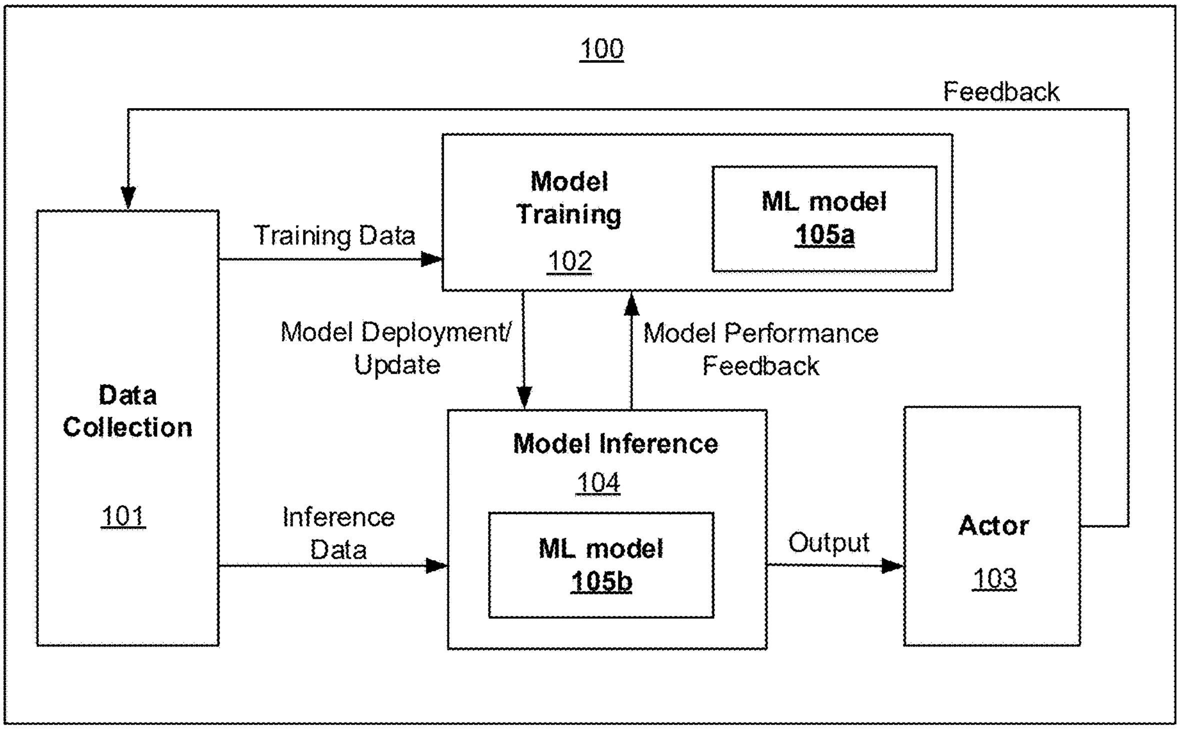
FIG. 2 illustrates a schematic view showing a system for executing a wireless communication method using ML models.

With reference to FIG. 2, a system 100 for the wireless communication method based on machine learning comprises units of data collection 101, model training unit 102, actor 103, and model inference 104. Please note that FIG. 2 does not necessarily limit the wireless communication method to the instant example. The wireless communication method is applicable to any design based on machine learning. The general steps comprise data collection and/or model training and/or model inference and/or (an) actor(s).

The data collection unit 101 is a function that provides input data to the model training unit 102 and the model inference unit 104. AI/ML algorithm-specific data preparation (e.g., data pre-processing and cleaning, formatting, and transformation) is not carried out in the data collection unit 101.

Examples of input data may include measurements from UEs or different network entities, feedback from Actor 103, and output from an AI/ML model.

Training data is data needed as input for the AI/ML Model training unit 102.

Inference data is data needed as input for the AI/ML Model inference unit 104.

The model training unit 102 is a function that performs the ML model training, validation, and testing. The Model training unit 102 is also responsible for data preparation (e.g., data pre-processing and cleaning, formatting, and transformation) based on training data delivered by the data collection unit 101, if required.

Model Deployment/Update between units 102 and 104 involves deployment or update of an AI/ML model (e.g., a trained machine learning model 105*a* or 105*b*) to the model inference unit 104. The model training unit 102 uses data units as training data to train a machine learning model 105*a* and generates a trained machine learning model 105*b* from the machine learning model 105*a*.

The model inference unit 104 is a function that provides AI/ML model inference output (e.g., predictions or decisions). The AI/ML model inference output is the output of the machine learning model 105*b*. The Model inference unit 104 is also responsible for data preparation (e.g., data pre-processing and cleaning, formatting, and transformation) based on inference data delivered by the data collection unit 101, if required.

The output shown between unit 103 and unit 104 is the inference output of the AI/ML model produced by the model inference unit 104.

Actor 103 is a function that receives the output from the model inference unit 104 and triggers or performs corresponding actions. The actor 103 may trigger actions directed to other entities or to itself.

Feedback between unit 103 and unit 101 is information that may be needed to derive training or inference data or performance feedback.

Figure 3:
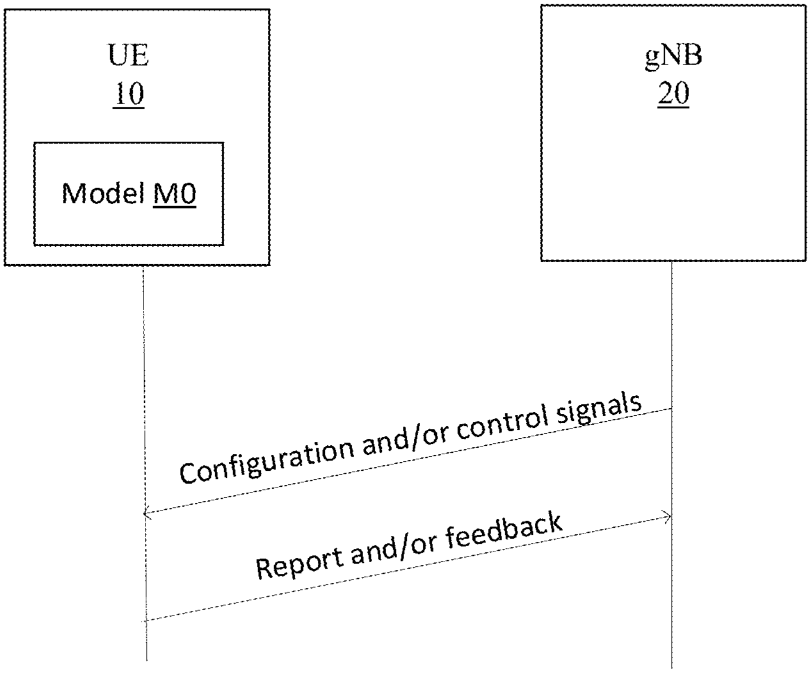
FIG. 3 illustrates a schematic view showing a system with a one-side model and two-sided models.
Figure 3:
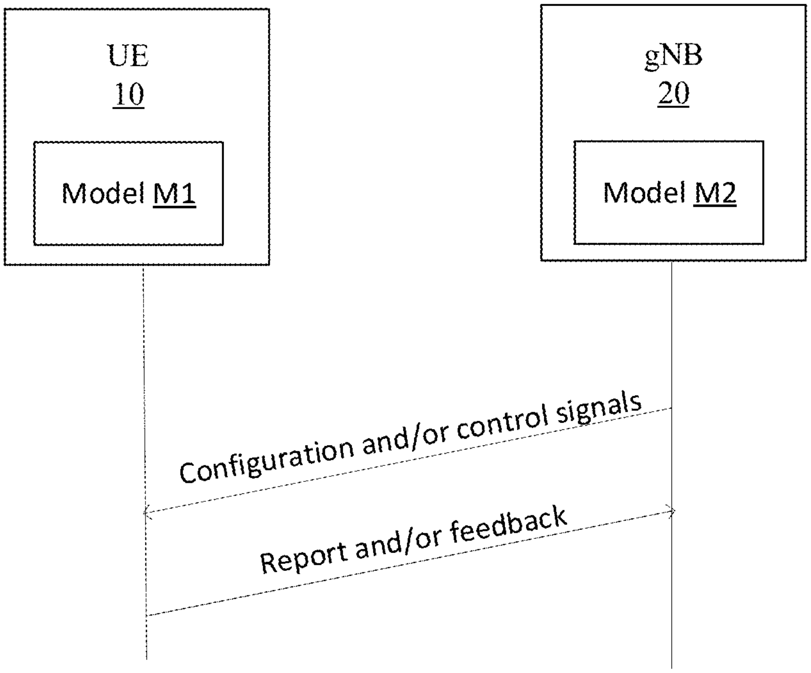
Figure 4:
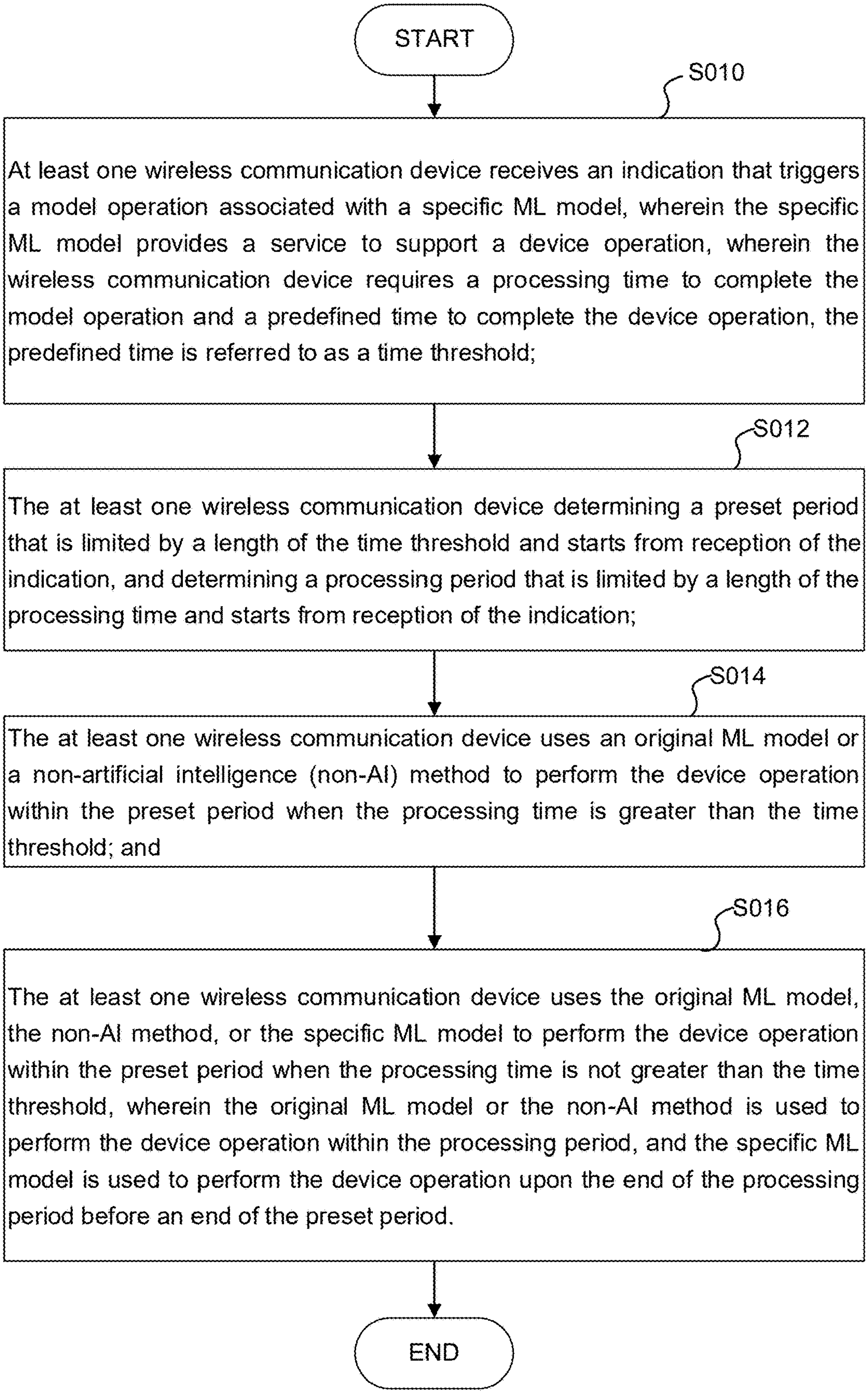
FIG. 4 illustrates a schematic view showing an embodiment of the disclosed method.

With reference to FIG. 3 and FIG. 4, an example of a UE 10 in the description may include one of the UE 10*a*. Examples of a gNB 20 in the description may include the base station 20*a* or 20*b*. Note that even though the gNB is described as an example of base station in the following, the disclosed method of may be implemented in any other types of base stations, such as an eNB or a base station for beyond 5G. Uplink (UL) transmission of a control signal or data may be a transmission operation from a UE to a base station. Downlink (DL) transmission of a control signal or data may be a transmission operation from a base station to a UB. The disclosed method is detailed in the following. The UE 10 and a base station, such as a gNB 20, execute the wireless communication method based on machine learning.

With reference to FIG. 3, in a system (a), an ML model M0 is a one-sided model deployed at the UE 10. In a system (b), an ML model M1 is a portion of a two-sided model deployed at the UE 10, and an ML model M2 is a portion of a two-sided model deployed at the gNB 20. In an example, the ML model M0 is deployed at the gNB side.

FIG. 4 shows an embodiment of the disclosed method. At least one wireless communication device executes a wireless communication method based on machine learning. In an embodiment, the at least one wireless communication device may comprise a user equipment (UE). In another embodiment, the at least one wireless communication device may comprise a base station. In still another embodiment, the at least one wireless communication device may comprise a combination of UEs and base stations.

At least one wireless communication device receives an indication that triggers a model operation associated with a specific ML model, wherein the specific ML model provides a service to support a device operation, wherein the wireless communication device requires a processing time to complete the model operation and a predefined time to complete the device operation, the predefined time is referred to as a time threshold (S010). In some embodiments of the disclosure, the model operation comprises model selection, model activation, mode deactivation, model switching, model fallback, model training, model monitoring, and/or model fine-tuning, and the device operation comprises channel state information (CSI) reporting, beam prediction, or UE positioning. The specific ML model comprises a one-sided model at UE side, one-sided model at gNB side, or two-sided models.

In some embodiments of the disclosure, when the specific ML model has multiple processing times. The multiple processing times may relate to different operations, or the same operations for different model complexity levels. The wireless communication device selects one maximum processing time from the multiple processing times.

In some embodiments of the disclosure, the time threshold is determined and reported by the wireless communication device. Alternatively, the time threshold is configured by a base station (e.g., gNB 20) in a configuration message received by the wireless communication device. Alternatively, the time threshold is first reported by the wireless communication device to the base station and subsequently configured by the base station. The configuration message may comprise at least one of a radio resource control (RRC) signal, a medium access control (MAC) control element (CE), or downlink control information (DCI).

At least one wireless communication device determines a preset period that is limited by a length of the time threshold and starts from reception of the indication, and determines a processing period that is limited by a length of the processing time and starts from reception of the indication (S012).

The at least one wireless communication device uses an original ML model or a non-artificial intelligence (non-AI) method to perform the device operation within the preset period when the processing time is greater than the time threshold (S014). For example, the original ML model may comprise a legacy ML model in case of model update or a source ML model in case of model switching. In some embodiments of the disclosure, whether to use the original ML model or the non-AI method within the preset period when the processing time is not greater than the time threshold is configured in a configuration message received by the wireless communication device. The configuration message may comprise a radio resource control (RRC) signal, a medium access control (MAC) control element (CE), or downlink control information (DCI). The gNB 20 may provide the configuration message to the UE 10.

The at least one wireless communication device uses the original ML model, the non-AI method, or the specific ML model to perform the device operation within the preset period when the processing time is not greater than the time threshold (S016). The at least one wireless communication device uses the original ML model or the non-AI method to perform the device operation within the processing period. The at least one wireless communication device uses the specific ML model to perform the device operation upon the end of the processing period before an end of the preset period.

In some embodiments of the disclosure, the device operation is associated with two time thresholds comprising a first time threshold is for the device operation based on a service provided by the legacy ML model, and a second time threshold for the device operation based on a service provided by the non-AI method.

During a first preset period from reception of the indication to an end of the first preset period limited by a length of the first time threshold, if the device operation occurs, the wireless communication device uses the legacy ML model to perform the device operation.

During the end of the first preset period limited by a length of the first time threshold 1 to an end of a second preset period limited by a length of the second time threshold 2, if the device operation occurs, the wireless communication device uses the non-AI methods to perform the device operation, wherein the second preset period starts from the reception of the indication.

Embodiment 1

Model switching is an operation that a device, such as UE 10, can perform to deactivate a first model (referred to as a source ML model, e.g., a legacy ML model) and activate a second model (referred to as a destination ML model, e.g., a new model).

When no proper model is available for model switching, fallback is an operation a device, such as UE 10, may perform. For example, the UE 10 may fall back from an incumbent ML model (e.g., a new ML model, a fine-tuned ML model, an updated ML model) to a backup ML model (e.g., a legacy ML model, an ML model before fine-tuning, an ML model before the update).

When no proper model is available for model switching, the model fine-tuning is an operation a device, such as UE 10, may perform. Model fine-tuning may be realized by retraining an ML model using a specific data set or placing the ML model in a specific environment. Whether a UE can perform model fine-tuning is a UE capability. Some UE supports fine-tuning and some do not.

Depending on the quality of service (QoS) requirements, the ML model for certain QoS traffic must be fine-tuned to have a better performance.

Whether to fine tune an ML model can be configured by the gNB 20 or a third node into a network (e.g., gNB 20) configuration.

In an example, the model has been deployed at the UE side as one-sided model. In an example, the model has been deployed at the UE side as two-sided model where the UE is deployed a CSI generation model as one part of the two-sided model. Embodiments of the disclosure can be applied to the examples of one-side model and two-sided model.

Figure 5:
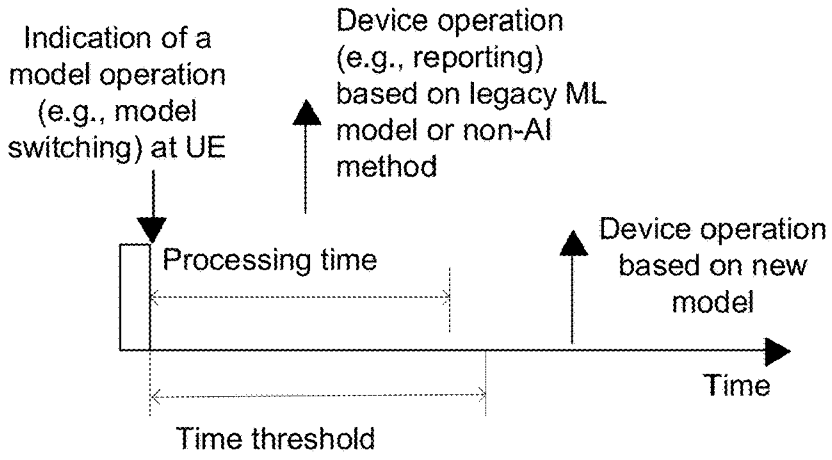
FIG. 5 illustrates a schematic view showing a time threshold during a device operation, such as model activation or model switching, at UE side.

FIG. 5 shows a time threshold during a device operation, such as model activation or model switching, at UE side.

The device (e.g., the UE 10 or gNB 20) may require a processing time to complete a model operation and a time threshold to complete a device operation. If a gap in time is between two operations, the device (e.g., the UE 10 or gNB 20) may fall back to the non-AI methods (or non-AI services) or use a method (or service) provided by a legacy ML model.

If the UE 10 must complete a device operation within a time threshold, whether the device operation is based on legacy AI method or non-AI method may be configured by gNB in a configuration message. As an example, if the UE 10 must report within a time threshold, whether the report is based on legacy AI method or non-AI method may be configured by gNB in a configuration message. The configuration message may be a radio resource control (RRC) signal, a medium access control (MAC) control element (CE), or downlink control information (DCI).

As an embodiment, the time threshold is determined and reported by the UE 10 to the gNB 20.

As an embodiment, the time threshold is configured by gNB 20.

As an embodiment, the time threshold is first reported by the UE 10 to the gNB 20 and subsequently configured by gNB. For example, the UE may report two time thresholds for different complexity models. The gNB may configure one of the time thresholds for the UE 10 according to the model complexity of a specific ML model that provides a service to a device operation of the UE 10. The specific ML model may be an ML model that has been deployed, installed, and executed in the UE 10 or an ML model to be sent to the UE 10 from the gNB 20.

In some embodiments, the time threshold may be configured by the gNB 20 or a third node in a configuration message. The configuration message may be at least one of a radio resource control (RRC) signal, a medium access control (MAC) control element (CE), or downlink control information (DCI).

The UE 10 receives an indication or an event that triggers a model operation associated with a specific ML model. The indication may be sent from the gNB 20 or the third node to the UE 10. The ML model provides a service to support a device operation, such as CSI reporting, beam selection, or others. The UE 10 may require a processing time to complete the model operation and a time threshold to complete the device operation In an example, the model operation is model activation that is to activate the specific ML model. The model activation requires a processing time to activate the specific ML, and the device operation has a time threshold. The UE is required to perform the device operation, such as reporting CSI to the gNB, beam selection, or others, within a preset period that is limited by a length of the time threshold and starts from reception of the indication or the event. The UE 10 may use a timer to time the time threshold. If the processing time is greater than a time threshold, the UE uses a legacy ML model or a non-AI method to perform the device operation within the preset period limited by a length of the time threshold. The UE 10 uses a legacy ML model or a non-AI method to perform the device operation before the end of a processing period that is limited by a length of the processing time and starts from reception of the indication or the event. The UE 10 uses the specific ML model to perform the device operation upon the end of a processing period that is limited by a length of the processing time and starts from reception of the indication or the event.

If a gap in time is between two the preset period and the processing period, the device (e.g., the UE 10 or gNB 20) may use the non-AI methods (or non-AI services) or use a method (or service) provided by a legacy ML model to perform the device operation. Whether the device (e.g., the UE 10 or gNB 20) use the non-AI methods (or non-AI services) or use a method (or service) provided by a legacy ML model to perform the device operation before the end of the processing period may be configured by the UE 10, gNB 20, or the third node.

If the processing time is not greater than a time threshold, the UE uses a legacy ML model (or its configuration or its parameters, or the legacy ML model) or a non-AI method to perform the device operation within the processing period that is limited by a length of the processing time and starts from reception of the indication of the event, and use the activated specific ML model (or configuration or parameters, or the specific ML model) to perform the device operation upon the end of the processing period within the time threshold. Alternatively, the UE uses a legacy ML model specific or a non-AI method to perform the device operation within the time threshold that starts from reception of the indication of the event, and uses the activated specific ML model (or configuration or parameters, or the specific ML model) to perform the device operation upon reaching the end of the time threshold. In some examples, the processing time is the same as the time threshold.

If a gap in time is between two the preset period and the processing period, the device (e.g., the UE 10 or gNB 20) may use the non-AI methods (or non-AI services) or use a method (or service) provided by a legacy ML model to perform the device operation. Whether the device (e.g., the UE 10 or gNB 20) use the non-AI methods (or non-AI services) or use a method (or service) provided by a legacy ML model to perform the device operation before the end of the processing period may be configured by the UE 10, gNB 20, or the third node.

Embodiment 2

In an example, an ML model is deployed as one-sided model at the gNB 20 or a third node, such as a CN network entity in the core network or an application server in the packet data network. In the following description, even though embodiments are detailed with the example where an ML model is deployed as one-sided model at the gNB 20, the embodiments may be applied to any example where an ML model is deployed as one-sided model at the third node.

Figure 6:
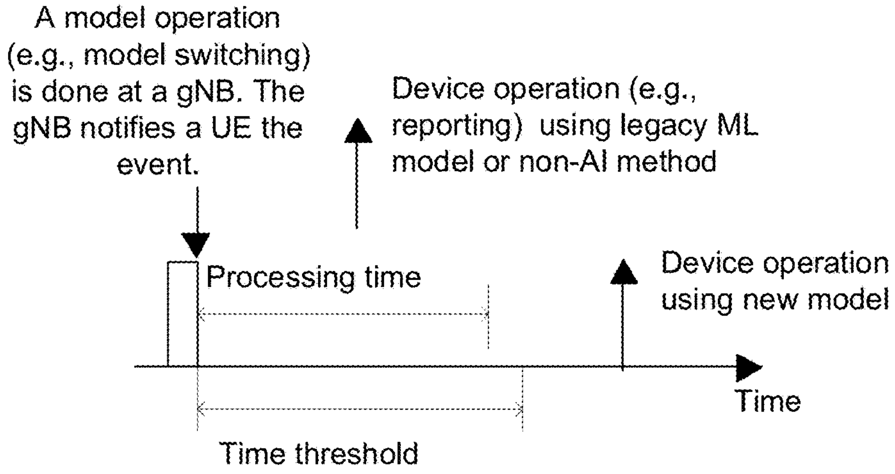
FIG. 6 illustrates a schematic view showing a time threshold during a device operation, such as model switching, at UE side.

FIG. 6 illustrates a schematic view showing a time threshold during a device operation, such as model switching, at UE side In an example, the model operation is model switching that is to activate the specific ML model. The model switching requires a processing time to activate the specific ML, and the device operation has a time threshold. The device (e.g., the UE 10 or gNB 20) is required to perform the device operation, such as reporting CSI to the gNB, beam selection, or others, within a preset period that is limited by the time threshold and starts from reception of the indication or the event. The device (e.g., the UE 10 or gNB 20) may use a timer to time the time threshold. If the processing time is greater than a time threshold, the device (e.g., the UE 10 or gNB 20) uses a legacy ML model or a non-AI method to perform the device operation within the preset period limited by the time threshold, and uses the specific ML model to perform the device operation upon the end of a processing period that is limited by a length of the processing time and starts from reception of the indication or the event.

If a gap in time is between two the preset period and the processing period, the device (e.g., the UE 10 or gNB 20) may use the non-AI methods (or non-AI services) or use a method (or service) provided by a legacy ML model to perform the device operation. Whether the device (e.g., the UE 10 or gNB 20) use the non-AI methods (or non-AI services) or use a method (or service) provided by a legacy ML model to perform the device operation before the end of the processing period may be configured by the UE 10, gNB 20, or the third node.

If the processing time is not greater than a time threshold, the device (e.g., the UE 10 or gNB 20) uses a legacy ML model or a non-AI method to perform the device operation within the processing period that is limited by a length of the processing time and starts from reception of the indication or the event, and use the activated specific ML model to perform the device operation upon the end of the processing period within the time threshold.

If a gap in time is between two the preset period and the processing period, the device (e.g., the UE 10 or gNB 20) may use the non-AI methods (or non-AI services) or use a method (or service) provided by a legacy ML model to perform the device operation. Whether the device (e.g., the UE 10 or gNB 20) use the non-AI methods (or non-AI services) or use a method (or service) provided by a legacy ML model to perform the device operation before the end of the processing period may be configured by the UE 10, QNB 20, or the third node.

For example, the processing time is decided based on network propagation delay and processing time required by the third node.

Figure 7:
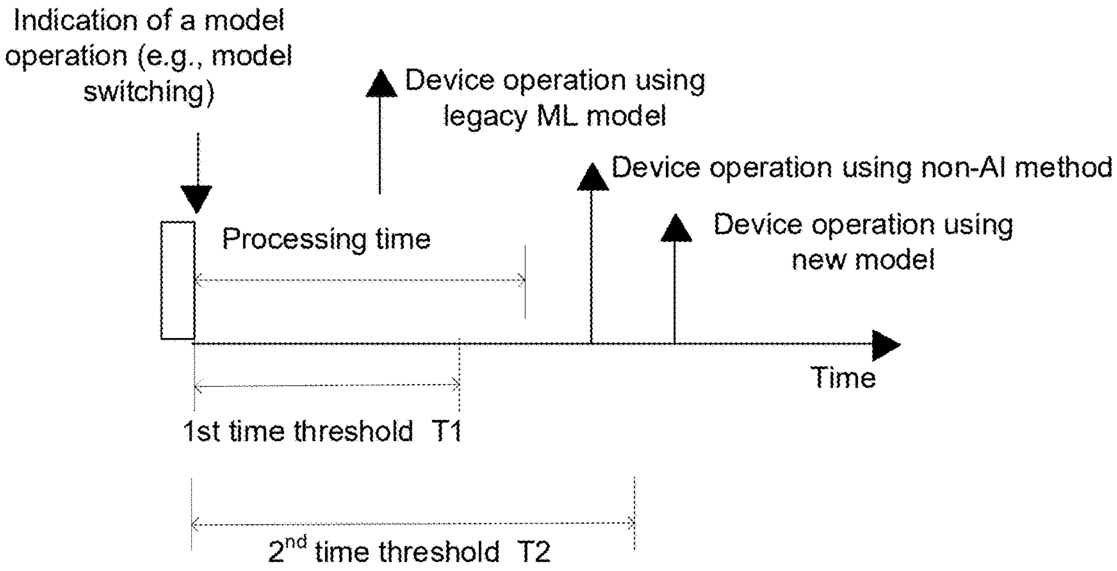
FIG. 7 illustrates a schematic view showing two time thresholds during a device operation, such as model switching, at UE side.

FIG. 7 shows two time thresholds during a device operation, such as model switching, at UE side.

In an embodiment, the UE has two time thresholds for two different device operations. In an embodiment, one device operation is associated with two time thresholds. For example, a first time threshold 1 is for a device operation based on a method (or service) provided by a legacy ML model, and a second time threshold 2 is used for a device operation based on a method (or service) provided by the non-AI method and new ML model.

First Time threshold 1: During a first preset period from reception of the indication to an end of the first preset period limited by a length of the first time threshold 1, if any device operation occurs, the device (e.g., the UE 10 or gNB 20) may use a method (or service) provided by a legacy ML model to perform the device operation.

Second Time threshold 2: During the end of the first preset period limited by a length of the first time threshold 1 to an end of the second preset period limited by a length of a second time threshold 2, if any device operation occurs, the device (e.g. the UE 10 or gNB 20) may use the non-AI methods (or non-AI services) to perform the device operation. The second preset period starts from the reception of the indication.

If any device operation occurs after the end of the second preset period limited by the length of the second time threshold 2, the device (e.g., the UE 10 or gNB 20) may use the new activated ML model to perform the device operation.

When an ML model has multiple processing times, the UE may select one maximum processing time from the multiple processing times. In an embodiment, the gNB 20 may configure the maximum processing time. In an example, the processing time is defined by 3GPP RAN4.

As an example, the processing time is the time threshold. If a device operation is required to be performed between reception of the indication and the end of the processing period limited by the processing time, the UE may use the non-AI methods (or non-AI services) or use a method (or service) provided by a legacy ML model to perform the device operation according to a legacy configuration. Otherwise, the UE will apply the configurations for the ML model.

Embodiment 3

Some operations cannot be performed together or at the same time due to logical issues. For example, two operations have time dependency.

An ML model cannot be monitored and fine-tuned simultaneously. For example, the UE 10 does not expect to fine-tune an ML model when the ML model is under monitoring. The model monitoring shall be performed on a stable model. Model fine-tuning may actually update an ML model. The updated ML model can be tested or monitored after fine-tuned.

For example, an ML model when activated cannot be fine-tuned.

In an example, the UE 10 does not expect to fine tune an ML model when the ML model is activated.

In an example, the UE 10 does not expect to fine tune an ML model when the ML model is under monitoring.

In an example, the UE 10 does not expect to fine tune an ML model when the ML model is under model inference.

The wireless communication device generates a duplicated ML model of an activated ML model, i.e., a copy of the activated model. The copy of the activated ML image is fine-tuned without interrupting the operations of the activated ML model. After copy of the activated ML image is fine-tuned, the wireless communication device switches to the fine-tuned copy of the activated ML image. In an embodiment, whether the activated ML model can be duplicated is a model attribute of the activated ML model.

In an embodiment, a device (e.g., the UE 10 or the gNB 20) generates a duplicated image of an activated ML model a copy of the activated model. The device fine-tunes the copy of the activated ML image without interrupting the operations of the activated ML model.

In an embodiment, whether an ML model can be duplicated is a model attribute. For example, a value {1} of the model attribute indicates that the model can be duplicated, and {0} of the model attribute indicates that the model cannot be duplicated. For example, some proprietary models belonging to private entities cannot be duplicated. Some models trained for general purpose can be duplicated.

Figure 8:
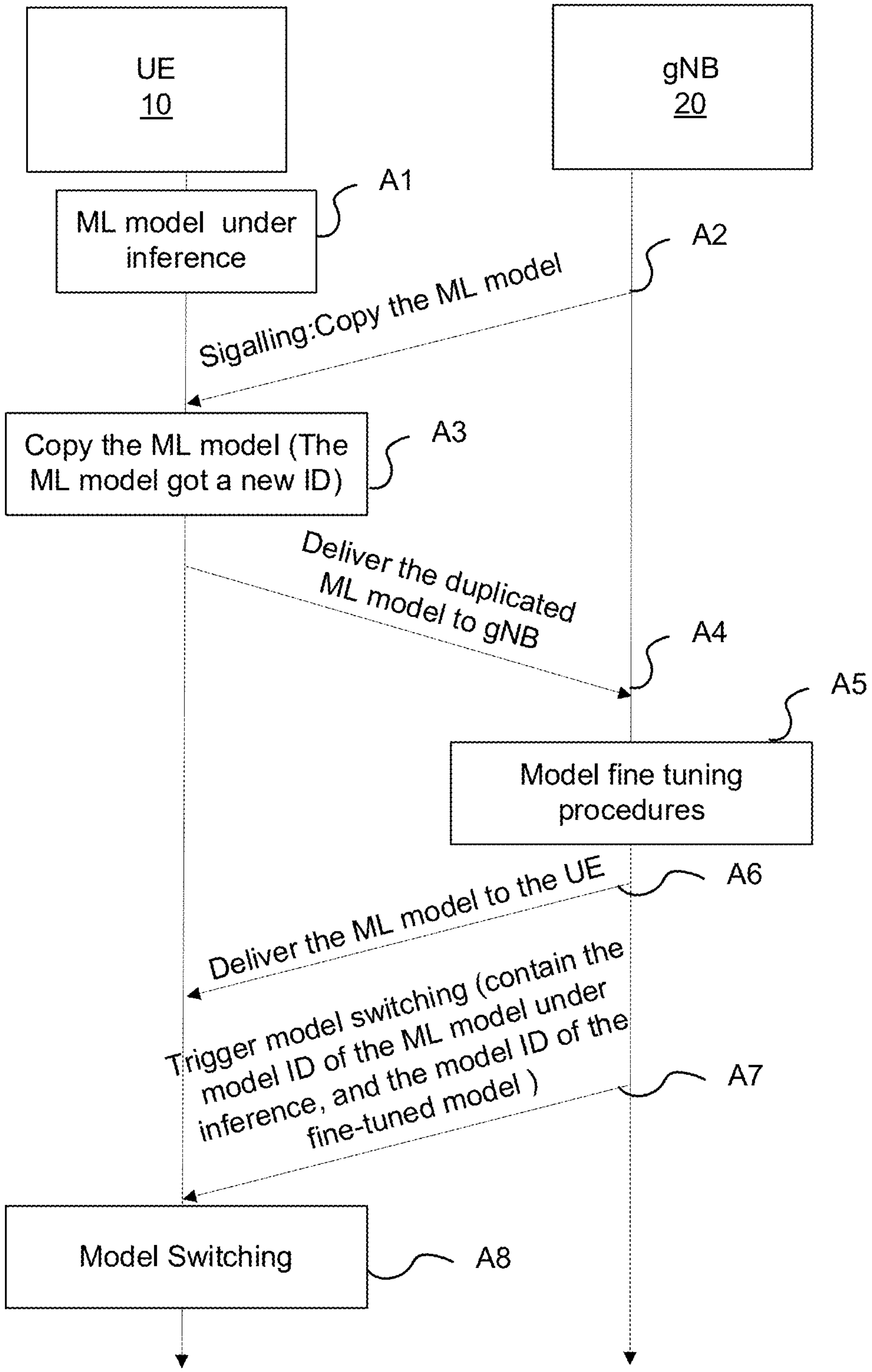
FIG. 8 illustrates a schematic view showing still an embodiment of the disclosed method using a copy of an activated ML model

With reference to FIG. 8, in this example, the ML model is deployed at UE side as a one-sided model. The ML model supports the fine tuning and can be duplicated. The wireless communication device transmits the duplicated ML model to a base station (e.g., gNB 20) and receives a fine-tuned ML model of the duplicated ML model from the base station.

The wireless communication device receives a trigger signal that triggers model switching at the wireless communication device. The model switching instructs the wireless communication device to activate the fine-tuned duplicated ML model.

FIG. 8 illustrates an embodiment of the disclosed method using a copy of an activated ML model. In an embodiment, fine-tuning for an activated ML model during inference provided by the ML model is realized by a fine-tuning a duplicated ML model of the activated ML model.

A1. An activated ML model is performing inference at the UE 10.

A2. The activated ML model is configured to be duplicated by the UE 10 in response to a duplication signal. A new model ID for the duplicated ML model is configured to the UE 10 by the gNB 20.

A3. The UE 10 duplicates the activated ML model by generating a duplicated ML model of the activated ML model.

A4. The UE 10 reports the completion of model duplication and delivers the duplicated ML model to gNB 20 through a physical uplink control channel (PUCCH) or physical uplink shared channel (PUSCH).

A5. The gNB 20 performs fine-tuning of the new duplicated ML model. In some examples, the fine tuning may be performed at a third node.

A6. The gNB 20 delivers the fine-tuned ML model to the UE 10.

A7. The gNB 20 triggers model switching at UE side by sending a trigger signal to the UE 10. The trigger signal may be an RRC signal, MAC-CE, or DCL A8. The UE 10 performs model switching in response to the trigger signal. The model switching activates the fine-tuned ML model at the UE 10. The trigger signal for model switching contains the model ID of the ML model to be replaced and the model ID of an ML model (i.e., the fine-tuned ML model) to be switched to.

In some embodiments, the ML model can be transmitted as a data packet in PUSCH or physical downlink shared channel (PDSCH).

Embodiment 4

Figure 9:
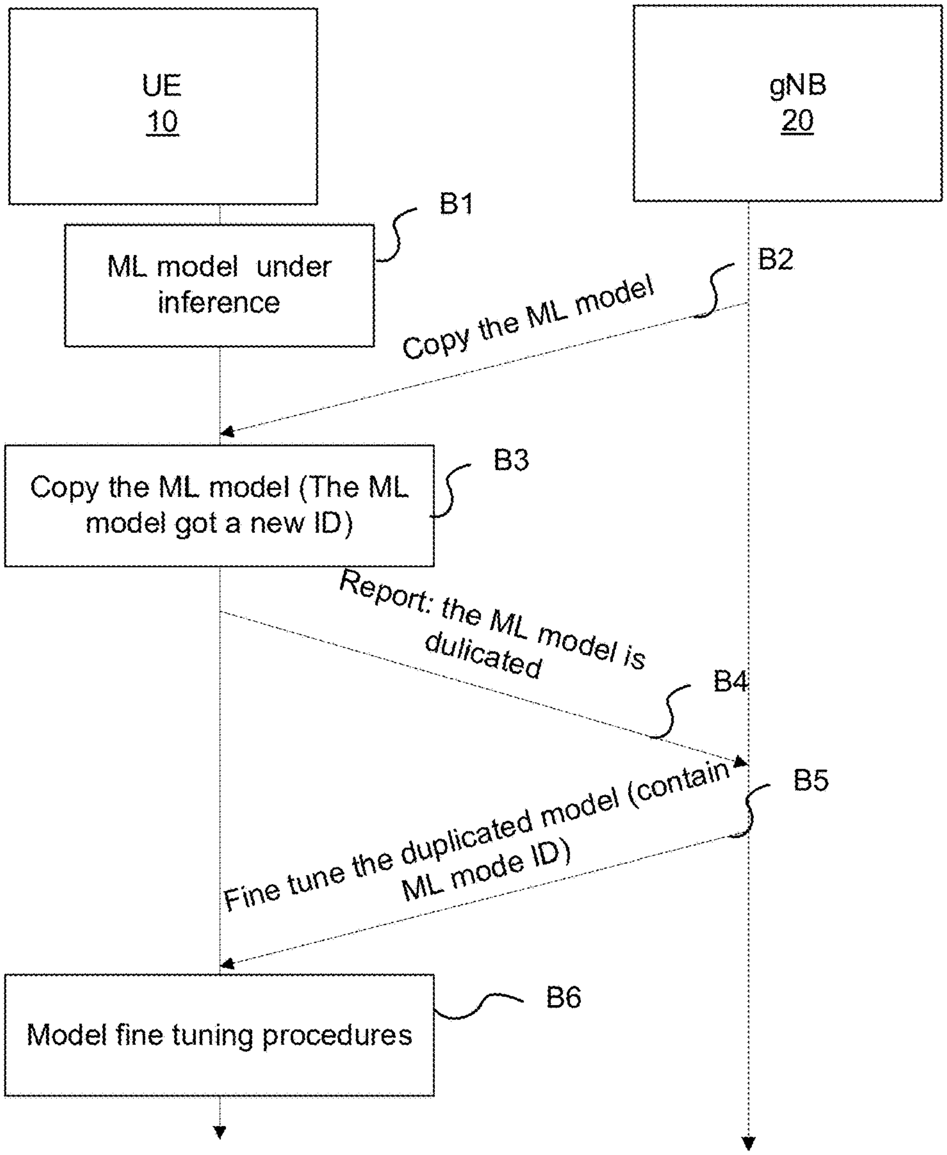
FIG. 9 illustrates a schematic view showing still another embodiment of the disclosed method using a copy of an activated ML model.

FIG. 9 shows a procedure of simultaneously inference and fine-tuning with a copy of the activated ML model.

The wireless communication device receives configuration for fine-tuning the duplicated ML model. The configuration contains an ML model identifier (ID) of the duplicated ML model. The wireless communication device performs a model fine tuning procedure for the duplicated ML model according to the configuration.

B1. An activated ML model is performing inference at the UE 10.

B2. The activated ML model is configured to be duplicated by the UE 10 in response to a duplication signal. The UE 10 generates a duplicated ML model of the activated ML model. A new model ID for the duplicated ML model is configured to the UE 10 by the gNB 20.

B3. The UE 10 duplicates the activated ML model by generating a duplicated ML model of the activated ML model.

B4. The UE 10 reports the completion of model duplication and delivers the duplicated ML model to gNB 20 through a physical uplink control channel (PUCCH) or physical uplink shared channel (PUSCH).

B5. The gNB 20 provides configuration for fine-tuning the new duplicated ML model to the UE 10. The configuration contains an ML model identifier (ID) to denote a specific ML model. In the embodiment, the configuration comprises an ML model ID of the duplicated ML model.

B6. The UE 10 receives the configuration and performs a model fine tuning procedure for the duplicated ML model according to the configuration.

Figure 10:
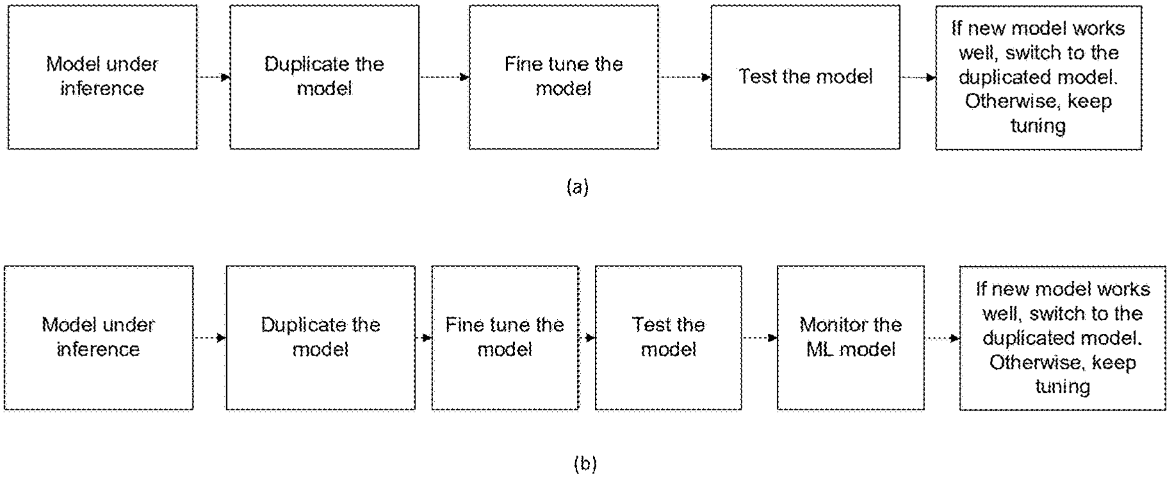
FIG. 10 illustrates a schematic view showing a procedure of model test and a procedure of model monitoring

With reference to FIG. 10(*a*), in some examples, the ML model after being fine-tuned is tested and when passing the test, can serve as a new ML model to be activated or switched to. The test of a fine-tuned ML model is carried out at UE 10 or gNB 20.

With reference to FIG. 10(*b*), in some examples, the ML model after being fine-tuned is tested and monitored. When passing the test and monitoring, the ML model can serve as a new ML model to be activated or switched to. The test of a fine-tuned ML model is carried out at UE 10 or gNB 20.

Model monitoring uses the data collected in real-time. Model testing can use either the collected historical data or real time data to carry out the test. Thus, the ML model can provide inference while being fine-tuned.

In some examples, whether a UE supports the ML model duplication is a UE capability. The UE 10 may report to the network or gNB 20 as the UE capability of model duplication

Embodiment 5

An embodiment of the disclosure provides a method to solve the conflicts between model switching and model update. Generally, the model switching is performed in a smaller time scale compared with model update (including model fine-tuning and mode training). Whether to perform model switching or model update can be determined based on a configuration configured by the UE 10, the gNB 20 or a third node.

In some examples, the UE reports its preference when model switching and model update are both available. The preference may be represented by a preference attribute (or parameter). The report may be carried in uplink control information (UCI) that is transmitted from the UE 10 to the gNB 20.

In an embodiment, the wireless communication device reports a preference attribute. A first value of the preference attribute shows that model switching is preferred over model update, and a second value of the preference attribute shows that model update is preferred over model switching. For example, a value {0} of a preference attribute shows that model switching is preferred over model update, a value {1} of a preference attribute shows that model update is preferred over model switching.

In an embodiment, the wireless communication device receives a preference configuration comprising a preference attribute. A first value of the preference attribute shows that model switching is preferred over model update, and a second value of the preference attribute shows that model update is preferred over model switching.

For example, the gNB 20 or the third node configures the preference for the UE 10 when model switching and model update are both available. The preference may be represented by a preference attribute (or parameter) that is transmitted from the gNB 20 or third node to the UE 10. For example, a value {0} of a preference attribute shows that model switching is preferred over model update, a value {1} of a preference attribute shows that model update is preferred over model switching.

The preference configuration can be carried in a RRC signal, MAC-CE, or a DCI field to the UE 10.

Figure 11:
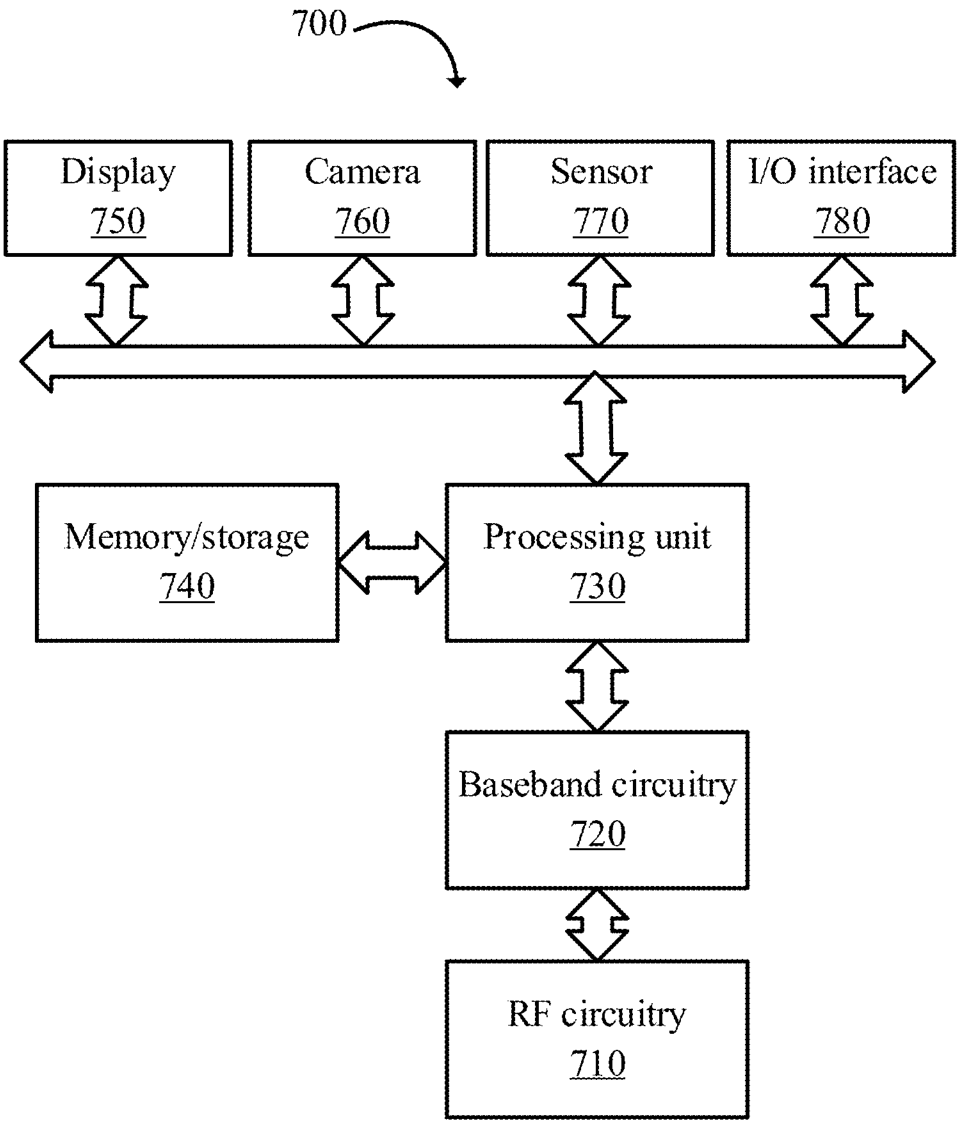
FIG. 11 illustrates a schematic view showing a system for wireless communication according to an embodiment of the present disclosure.

FIG. 11 is a block diagram of an example system 700 for wireless communication according to an embodiment of the present disclosure. Embodiments described herein may be implemented into the system using any suitably configured hardware and/or software. FIG. 11 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that can be adopted in 3GPP specification to create an end product.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random-access memory (RAM), a floppy disk, or other kinds of media capable of storing program codes.

The disclosure provides a wireless communication method and a wireless communication device. The device receives an indication that triggers a model operation associated with a specific ML model, wherein the specific ML model provides a service to support a device operation, wherein the wireless communication device requires a processing time to complete the model operation and a predefined time to complete the device operation. The predefined time is referred to as a time threshold. The device uses specific ML model, the original ML model, or a non-artificial intelligence (non-AI) method to perform the device operation within the preset period based a relation between the processing time and the time threshold.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A wireless communication method for machine learning (ML), executable in a wireless communication device, comprising:

receiving an indication that triggers a model operation associated with a specific ML model, wherein the specific ML model provides a service to support a device operation, wherein the wireless communication device requires a processing time to complete the model operation and a predefined time to complete the device operation, the predefined time is referred to as a time threshold;

determining a preset period that is limited by a length of the time threshold and starts from reception of the indication, and determining a processing period that is limited by a length of the processing time and starts from reception of the indication;

using an original ML model or a non-artificial intelligence (non-AI) method to perform the device operation within the preset period when the processing time is greater than the time threshold; and using the original ML model, the non-AI method, or the specific ML model to perform the device operation within the preset period when the processing time is not greater than the time threshold, wherein the original ML model or the non-AI method is used to perform the device operation within the processing period, and the specific ML model is used to perform the device operation upon the end of the processing period before an end of the preset period.

2. The method of claim 1, wherein the model operation comprises model selection, model activation, mode deactivation, model switching, model fallback, model training, model monitoring, and/or model fine-tuning.

3. The method of claim 1, wherein the device operation comprises channel state information (CSI) reporting, beam prediction, or UE positioning.

4. The method of claim 1, wherein the specific ML model comprises a one-sided model or two-sided models.

5. The method of claim 1, wherein whether to use the original ML model or the non-AI method within the preset period when the processing time is not greater than the time threshold is configured in a configuration message received by the wireless communication device.

6. The method of claim 5, wherein the configuration message comprises a radio resource control (RRC) signal, a medium access control (MAC) control element (CE), or downlink control information (DCI).

7. The method of claim 1, wherein the device operation is associated with two time thresholds comprising a first time threshold is for the device operation based on a service provided by the legacy ML model, and a second time threshold for the device operation based on a service provided by the non-AI method, wherein during a first preset period from reception of the indication to an end of the first preset period limited by a length of the first time threshold, if the device operation occurs, the wireless communication device uses the legacy ML model to perform the device operation;

during the end of the first preset period limited by a length of the first time threshold 1 to an end of a second preset period limited by a length of the second time threshold 2, if the device operation occurs, the wireless communication device uses the non-AI methods to perform the device operation, wherein the second preset period starts from the reception of the indication.

8. The method of claim 1, wherein when the specific ML model has multiple processing times, the wireless communication device selects one maximum processing time from the multiple processing times.

9. The method of claim 1, wherein the time threshold is determined and reported by the wireless communication device; or the time threshold is configured by a base station in a configuration message received by the wireless communication device; or the time threshold is first reported by the wireless communication device to the base station and subsequently configured by the base station.

10. The method of claim 9, wherein the configuration message comprises a radio resource control (RRC) signal, a medium access control (MAC) control element (CE), or downlink control information (DCI).

11. The method of claim 1, wherein the wireless communication device generates a duplicated ML model of an activated ML model a copy of the activated model; and the copy of the activated ML image is fine-tuned without interrupting the operations of the activated ML model the wireless communication device switches to the fine-tuned copy of the activated ML image.

12. The method of claim 11, wherein whether the activated ML model can be duplicated is a model attribute of the activated ML model.

13. The method of claim 11, wherein the wireless communication device transmits the duplicated ML model to a base station and receives a fine-tuned ML model of the duplicated ML model from the base station; and the wireless communication device receives a trigger signal that triggers model switching at the wireless communication device, wherein the model switching instructs the wireless communication device to activate the fine-tuned duplicated ML model.

14. The method of claim 11, wherein the wireless communication device receives configuration for fine-tuning the duplicated ML model, the configuration contains an ML model identifier (ID) of the duplicated ML model; and the wireless communication device performs a model fine tuning procedure for the duplicated ML model according to the configuration.

15. The method of claim 1, wherein the wireless communication device reports a preference attribute, a first value of the preference attribute shows that model switching is preferred over model update, and a second value of the preference attribute shows that model update is preferred over model switching.

16. The method of claim 1, wherein the wireless communication device receives a preference configuration comprising a preference attribute, a first value of the preference attribute shows that model switching is preferred over model update, and a second value of the preference attribute shows that model update is preferred over model switching.

17. The method of claim 16, wherein the preference configuration is carried in a RRC signal, MAC-CE, or a DCI field.

18. A wireless communication device comprising:

a processor, configured to call and run a computer program stored in a memory, to cause a device in which the processor is installed to execute the method of claim 1.

19. A chip, comprising:

a processor, configured to call and run a computer program stored in a memory, to cause a device in which the chip is installed to execute the method of claim 1.

20. A non-transitory computer-readable storage medium, in which a computer program is stored, wherein the computer program causes a computer to execute the method of claim 1.

* * * * *